(12) United States Patent
Hori et al.

(10) Patent No.: US 6,353,528 B1
(45) Date of Patent: Mar. 5, 2002

(54) SOLID ACTIVATED CARBON, PROCESS FOR MANUFACTURING THE SAME AND ELECTRIC DOUBLE LAYER CAPACITOR USING THE SAME

(75) Inventors: Yuuichi Hori; Shinya Matsuno; Naotomo Hokajou; Masaki Hara, all of Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/083,343

(22) Filed: May 22, 1998

(51) Int. Cl.$^7$ .................................................. D01F 9/12
(52) U.S. Cl. ..................... 361/502; 429/231.8; 502/418; 502/437
(58) Field of Search ................................ 502/423, 429, 502/437, 418; 361/502; 429/231.8

(56) References Cited

U.S. PATENT DOCUMENTS

| | | | |
|---|---|---|---|
| 4,862,328 A | 8/1989 | Morimoto et al. | 361/502 |
| 5,021,391 A | * 6/1991 | Agui et al. | 502/417 |
| 5,043,310 A | * 8/1991 | Takeuchi et al. | 502/418 |
| 5,143,889 A | * 9/1992 | Takahio | 502/437 |
| 5,603,867 A | 2/1997 | Ohsaki et al. | 252/502 |

FOREIGN PATENT DOCUMENTS

| | | | |
|---|---|---|---|
| JP | 62 200715 | 9/1987 | |
| JP | 63107011 | 5/1988 | |
| JP | 63-173311 | 7/1988 | ............ H01G/9/00 |
| JP | 2297915 | 12/1990 | |
| JP | 3132009 | 6/1991 | |
| JP | 5121269 | 5/1993 | |
| JP | 5283287 | 10/1993 | |
| JP | 6045189 | 2/1994 | |
| JP | 6069075 | 3/1994 | |
| JP | 6069076 | 3/1994 | |
| JP | 6069077 | 3/1994 | |
| JP | 7099141 | 4/1995 | |
| JP | 8083736 | 3/1996 | |

* cited by examiner

Primary Examiner—Stuart L. Hendrickson
(74) Attorney, Agent, or Firm—Hogan & Hartson, L.L.P.

(57) ABSTRACT

Disclosed is a solid activated carbon and a process for manufacturing the solid activated carbon which is particularly suitable for electrode materials used in an electric double layer capacitor and various batteries. The use of the solid activated carbon makes it possible to prepare an activated carbon substrate having high mechanical strength and practical capacitance while the content of activated carbon is high. The solid activated carbon comprises an activated carbon powder and/or an activated carbon fiber, a carburized substance of a PVA or a resin derived from PVA, and a PVA or a resin derived from PVA. The process for manufacturing the solid activated carbon comprises, molding a molding material consisting of an activated carbon powder and/or an activated carbon fiber, a PVA or a resin derived from PVA or a mixture of a PVA or a resin derived from PVA and a mesophase using a known molding method, aging the molded compact in air and heat-treating the aged compact in a non-oxidizing atmosphere.

6 Claims, 1 Drawing Sheet

SOLID ACTIVATED CARBON, PROCESS FOR MANUFACTURING THE SAME AND ELECTRIC DOUBLE LAYER CAPACITOR USING THE SAME

FIELD OF THE INVENTION

The present invention relates to a solid activated carbon used as an adsorbent and a process for manufacturing the same. The present invention relates, particularly, to a solid activated carbon useful as an electrode for an electric double layer capacitor and to a process for manufacturing the solid activated carbon. The present invention also relates to an electric double layer capacitor using the solid activated carbon as an electrode.

DESCRIPTION OF THE BACKGROUND ART

A solid activated carbon is utilized as an adsorbent used for deodorizing, removal of harmful gas, and solvent recovery. The solid activated carbon is also useful for the refining of drinking water or foods and is adaptable to filter media used in wastewater treatment. It is necessary for the solid activated carbon to have a large specific surface area and high strength depending on its use, when it is used as adsorbents or filter media.

The solid activated carbon is particularly suitable to a pair of electrodes used for an electric double layer capacitor. The electric double layer capacitor is, as shown by the sectional structure in FIG. 1, provided with a pair of polarizable electrodes 1 composed of activated carbon with a specific form and with a liquid electrolyte 2 disposed between the pair of electrodes 1, making use of an electric double layer produced at the interface between the inner wall of a great number of pores in the activated carbon electrode 1 and the electrolyte 2 penetrating into the pores.

The activated carbon is porous with the total area of pores per unit volume, i.e. a specific surface area being large and hence the capacitance per unit volume of the capacitor is very large. It is also required for the electrode of the capacitor to possess, besides a large capacitance, low electric resistance of the electrode and to be highly strengthened with reduced occurrence of cracks or damages.

The electric double layer capacitor making use of the activated carbon as an electrode has a large capacitance. It can be also applied to batteries used as, for instance, an auxiliary power source for a large capacity motor, backup power source for a memory, or power source for vehicles.

There are many traditional processes for producing the solid activated carbon as follows:

(i) A process in which a kneaded mixture consisting of activated carbon, carbon black, micropowdery carbon, or electroconductive carbon and ethylene tetrafluoride (PTFE) resin, or other fluorine-containing polymer resins is formed into a sheet by means of roll forming, compression, extrusion, rolling, drawing, or combinations of these means to prepare solid activated carbon (see Japanese Patent Publication JP-A 62-200715, JP-A 63-17311, JP-A 63-173311, JP-A 5-121269, and JP-A 5-283287).

(ii) A process in which a carbon compound is carburized to prepare a carburized substance, which is subjected to a primary activation process to make a carbon base material and a binder is added to the carbon base material to form a molded compact, which is then carburized followed by secondary activation to obtain a plate activated carbon (see Japanese Patent Publication JP-A 8-83736).

(iii) A process in which a mixture of an activated carbon powder or activated carbon fiber, a granulated or powdery phenol resin, and a powdery or fibrous thermoplastic resin is shaped and heat-treated in a non-oxidizing atmosphere to obtain a solid activated carbon (see Japanese Patent Publication JP-A 7-99141).

(iv) A process in which a phenol resin molded compact is foamed, carburized, and activated to form a porous carbon compact, or in which mesophase pitch is then foamed, carburized, and activated to produce a porous molded compact (see Japanese Patent Publication JP-A 2-297915).

(v) A process in which only an activated carbon micropowder, or a mixture of the carbon micropowder, a carbon fiber or activated carbon powder and a mesophase carbon, is baked under pressure to produce a solid carbon (see Japanese Patent Publication JP-A 3-132009).

(vi) A process in which a mixture of an activated carbon powder and a powdery phenol resin is injection-molded, followed by heat treating to produce a solid activated carbon/carbon complex (see Japanese Patent publcation JP-A 6-45189).

(vii) A process in which a globular carbon material produced by carburizing a curable globular phenol resin and a thermally reactive globular phenol resin are mixed, a metallic mold is filled with the mixture to heat-cure the mixture under pressure, and the shaped product is heat-treated under an inert atmosphere and activated (see Japanese Patent pulication JP-A H6-69075, JP-A 6-69076, and JP-A 6-69077).

Such a solid activated carbon produced by the conventional production methods more increases in the specific surface area and thereby in the adsorption with an increase in an activated carbon component. The strength, on the contrary, decreases. In order to achieve a desired strength, the proportion of activated carbon in the compact is necessarily reduced.

In sum, the aforementioned solid activated carbon is produced by molding a mixture consisting of a porous activated carbon with a specific surface area increased to the extent that the durability and the mechanical strength are not impaired and various organic resin binders, and by carburizing the molded compact in a non-oxidizing atmosphere to unite the activated carbon and the resin binders. The amount of the activated carbon to be filled is limited to a fixed range in relation to the total of pores volume.

To improve the strength of the solid activated carbon, a large amount of the organic resin binder is required. This increases the potential that the pores of the activated carbon are blocked with the binder resin because of excellent wettability of the binder resin, which, coupled with the limited amount of the activated carbon, more reduces the specific surface area.

A resin binder having inferior forming characteristics, on the other hand, lacks potential to block the pores of the activated carbon because of its high viscosity and poor wettability. Such a resin binder, however, has the inferior endurance problem that the electrode is broken during the production process whereby the production yield is reduced or the electrode is broken during use whereby the function of the electric double layer capacitor is not fulfilled because of the reductions in the strength of the resulting molded compact and in the mechanical strength of the product after the carburizing heat treatment to unite the binder with the activated carbon.

The conventional solid activated carbon is also low in the proportion of activated carbon, posing the problems of low adsorption and reduced mechanical strength when it is utilized as an adsorbent used in deodorizing equipment, harmful gas-removing equipment, and for solvent recovery.

To be concrete, no conventional production processes allows production of solid activated carbons having an apparent density of 0.5 g/cm$^3$ or more, a strength of 300 gf/mm$^2$ or more, and a specific surface area of 500 m$^2$/g or more.

The solid activated carbon cannot be also mass-produced in the conventional process, giving rise to the problem of high production costs.

When, for instance, such a solid activated carbon is used as an electrode to form an electric double layer capacitor, the capacitance is smaller than the practical range and a large internal resistance results.

There have been therefore a demand for a solid activated carbon increased in the specific surface area of the pores, to the extent that the durability is not impaired, to increase the capacitance per unit volume of an electrode.

In addition, the capacitance of the solid activated carbon to be used as an electrode which is measured according to a constant-current discharge method reduces when the current density is as low as 30 mA/cm$^2$ as compared with the case of discharging at a current density as high as 300 mA/cm$^2$. When the capacitor is applied to such a battery for a power source which consumes electric power at a low current, the capacitance is more insufficient.

SUMMARY OF THE INVENTION

An object of the present invention is to provide a solid activated carbon which maintains a large specific surface area and has high mechanical strength.

Another object of the present invention is to provide a porous carbon electrode material containing a high proportion of activated carbon and therefore having high mechanical strength.

Still another object of the present invention is to provide a process for manufacturing a solid activated carbon capable of maintaining a large specific surface area and having high mechanical strength.

A further object of the present invention is to provide a process for manufacturing a porous carbon electrode material containing with a high proportion of activated carbon and therefore having high mechanical strength.

A still further object of the present invention is to provide a capacitor using a solid activated carbon to increase the capacitance of the capacitor.

A still further object of the present invention is to provide an electric double layer capacitor using a solid activated carbon, particularly a capacitor which is increased in the capacitance when discharging at a low current.

According to a first aspect of the present invention, there is provided a solid activated carbon comprising an activated carbon powder and/or an activated carbon fiber and a carburized substance produced by heat-treating a polymer of vinyl alcohol or its derivative.

Since the carburized substance contains the above polymer carburized substance, particularly mesophase carbon of a polymer, the solid activated carbon is formed of the combined powder or fiber firmly combined by the carburized substance while maintaining the porosity of the powder and/or fiber of activated carbon, ensuring a desirable specific surface area and strength.

According to a further aspect of the present invention, there is provided a solid activated carbon comprising an activated carbon powder and/or an activated carbon fiber and 0.5–10% by weight of a silicon (Si). In the invention, an activated carbon powder and/or an activated carbon fiber, an organic binder and a Si-containing compound are compounded. In a step of heat treatment, Si binds the activated carbon powder and/or fiber to reinforce the solid activated carbon. With the addition of the Si-containing compound and a small organic binder, a solid activated carbon having high strength and a large specific surface area can be obtained. As the Si-containing compound, high-silicate glass or organic silane derivatives may be used.

As for the solid activated carbon formed in the present invention, the size distribution of the pores of the activated carbon is defined so as to increase the capacitance of an electric double layer capacitor particularly in a discharging operation at a low current. The pore size distribution is designed in such a manner that the ratio of the volume of the pores with a size of 15 angstroms or less is 65% or more for the total volume of pores and the pore size giving the maximum differential pore volume is 8 angstroms or less. In the present invention, the pore size distribution is allowed to be near the distribution of the order of the size of the electrolyte ion thereby delaying discharge at a low current density to increase the capacitance.

BRIEF DESCRIPTION OF THE DRAWINGS

In the accompanying drawings, there are shown illustrative embodiments of the invention from which these other of its objectives, novel features, and advantages will be readily apparent.

In the drawings.

DETAILED DESCRIPTION OF THE INVENTION

Figure 1:
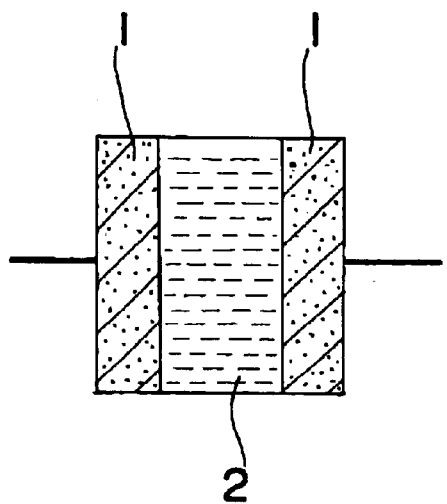
FIG. 1 is a typical view in section of an electric double layer capacitor using a solid activated carbon as an electrode.

The present invention will now be explained in detail.

In a first embodiment of the present invention, a solid activated carbon comprises an activated carbon powder and/or an activated carbon fiber and a carburized substance produced by heat-treating a polymer of vinyl alcohol or its derivatives.

In the solid activated carbon, preferably the carburized substance of the polymer may contain a mesophase carbon of the polymer. The solid activated carbon is formed of the powder or fiber firmly combined by the carburized substance while maintaining the porosity of the powder and/or fiber of activated carbon, to increase the specific surface area of the pores and to improve the mechanical strength.

In the present invention, the polymers of vinyl alcohol or its derivatives may be utilized as a binder for forming the activated powder into a product with a specific form. Also, as the polymers which is to be added, those which exist as a carburized substance in the solid activated carbon after heat-treatment with a part thereof being capable of coexisting as the polymer with the carburized substance are adopted. Also, the polymers of vinyl alcohol or its derivative may be widely used which crosslinks to increase in its binding strength when it is aged at a low temperature in advance and at least a part of which remains even if it is heat-treated for carburization, thereby ensuring high strength. The polymers of vinyl alcohol or its derivative includes polyvinyl alcohol, polyvinylacetal, and polyvinyl acetate. As polyvinylacetal, polyvinylformal, polyvinylacetoacetal or polyvinylbutyral may be used. Among these, polyvinylbutyral is preferred.

The aforementioned polymer may partly remain non-carburized when it is heat-treated. Preferably the amount of residual polymer contained in the solid activated carbon is more than 5.8 parts by weight for 100 parts by weight of the activated carbon powder and/or the activated carbon fiber. When the amount of the residual polymer is less than 5.8 parts by weight, the shape-keeping capability in a dry molding operation decreases and the strength of the resulting solid activated carbon after it is carburized is low. More preferably, the amount of the residual polymer is in a range from 15 to 48 parts by weight. When the amount falls in the above-defined range, the solid activated carbon has high strength and a large specific surface area of the pores and the capacitance of the solid activated carbon is large when it is used as a polarizable electrode of a capacitor. If the residual amount exceeds 64 parts by weight, the collapsibility of pelletized material is poor in the dry molding operation in the manufacturing process and the releasability of the molded compact from the mold decreases because the polymer is excessive in amount for the powder.

In the present invention, mesophase carbon of the polymer may be separately added and contained together with the polymer in the carburized substance produced by heat-treating the polymer. Mesophase carbon is carburized by heating and exists as a carbon material. The solid activated carbon finally produced is composed of a complex consisting of 50% by weight or more of an activated carbon powder and/or an activated carbon fiber and the rest of carburized substance or mesophase carbon of the polymer. The solid activated carbon can possess high strength and a large specific surface area of pores by increasing the proportion of the activated carbon powder an/or fiber.

As for mesophase carbon, generally, when an organic compound is heated, a C—C bond is unbound by heat decomposition reation to produce a low molecular weight radical thereby producing a high molecular weight aromatic hydrocarbon through the reactions such as the recombination of the radical, polymerization-condensation, cyclization, dehydrogenation, dealkylation, and aromatization. The aromatization of the resulting liquid phase further advances with an increase in the molecular weight and finally the liquid phase was carburized to produce a solid carbon. When aromatic hydrocarbon molecules are regularly a cumulated through these steps, a sort of crystal is produced. This crystallized intermediate is called "mesophase carbon".

In the process for manufacturing a solid activated carbon according to the present invention, an activated carbon powder and/or fiber and a polymer of vinyl alcohol or its derivative are mixed and molded into a product with a desired shape. The molded mixture is aged in air to cure the molded compact. Next, the cured product is heat-treated at a high temperature in a non-oxidizing atmosphere whereby the polymers are firmly bound and united with the activated carbon powder and/or fiber, to obtain a solid activated carbon.

As for the proportions of the starting materials, the polymer of polyvinyl alcohol or its derivative is preferably blended in an amount of 20 to 200 parts by weight for 100 parts by weight of the activated carbon powder and/or fiber. The polymer is mixed with the activated carbon powder and/or fiber with the content of activated carbon being 50% by weight or more whereby the shape is easily secured when the mixture is molded and hence dry pressing or roll forming is also applicable.

If the amount of the polymer is less than 20 parts by weight, the strength of the resulting solid activated carbon is insufficient whereas if the amount exceeds 200 parts by weight, the molded compact is possibly deformed during aging.

The amount of mesophase carbon is preferably 100 parts by weight or less for 100 parts by weight of the activated carbon powder and/or fiber.

The activated carbon powder and/or fiber and a mixture of the polymer and the mesophase carbon are mixed and molded into a product with a desired form such as a block or sheet, for instance, by dry pressing or roll forming.

The molded compact is aged as aforementioned. It is desirable that the aging be carried out at 150 to 300° C. in air in the case of using the polymer of polyvinyl alcohol or its derivative. This aging process has an object of promoting the crosslinking of the polymer of polyvinyl alcohol or its derivative during molding to reinforce the molded compact and finally to increase the strength of the resulting solid activated carbon obtained after heat-treatment. The blending of mesophase carbon is effective to promote the crosslinking of the polymer and to obtain a more strengthened solid activated carbon.

The aged molded compact is heat-treated at 600 to 1200° C. in a non-oxidizing atmosphere. The heat-treatment serves to carburize a part of the polymer and mesophase carbon thereby carrying out calcination to unite the compounds while maintaining the powder and/or fiber of activated carbon and thus the solid activated carbon can be obtained.

In the aging step, a small amount of the polymer can impart high strength to the molded compact. The amount of the polymer is designed to be small to prevent a number of pores of the activated carbon from being blocked. This ensures that the specific surface area of the solid activated carbon after the heat treatment never decreases. In this manner, the solid activated carbon consists of 50% by weight or more of activated carbon particles and less than 50% by weight of a binding carburized substance. Specifically, the solid activated carbon contains a high proportion of activated carbon with a large specific surface area of pores.

The solid activated carbon obtained in this manner can possess an apparent density of 0.5 g/cm$^3$ or more, a specific surface area of 500 m$^2$/g or more which is measured according to a BET method, and a three-point bending strength of 300 gf/mm$^2$ or more. Therefore, the solid activated carbon has a high capacitance and can reduce the internal electric resistance of the electrode and may be favorably utilized as a polarizable electrode.

A solid activated carbon according to a second embodiment in the present invention comprises activated carbon particles and a silicon (Si) compound.

The solid activated carbon, specifically, contains particles of an activated carbon powder or fiber, a carburized substance of an organic binder and a Si compound wherein Si exists probably in the form of glass between the activated carbon particles and between the carburized substance and the activated carbon particles to bind these materials firmly each other thereby producing a solid activated carbon having high strength.

Preferably Si is added in the form of a glass containing Si or of a silane compound because only a small amount of Si can impart a large specific surface area (that is, high capacitance) and high mechanical strength to the solid activated carbon.

The content of the Si compound is preferably in a range from 0.5 to 10% by weight converted into Si. A content less than 0.5% by weight has no effect upon the improvement in strength whereas a content exceeding 10% by weight causes a reduction in the specific surface area of the solid activated carbon.

The solid activated carbon is produced by preparing a mixture consisting of the particles of activated carbon powder or fiber, Si compound, and organic binder, by aging the mixture in an oxidizing atmosphere, and by heat-treatment the cured compact in a non-oxidizing atmosphere.

As the above silicon glass, preferably boro-silicated glass or high-silicated glass containing 70% by weight or more of $SiO_2$ may be used. An example of each of the compositions of these compounds is shown in Table 1.

TABLE 1

|  | Composition (wt %) | | | | |
| --- | --- | --- | --- | --- | --- |
|  | $SiO_2$ | $B_2O_3$ | $Al_2O_3$ | $Na_2O$ | $K_2O$ |
| Boro-silicated glass | 80 | 12 | 3 | 5.0 | 0 |
| High-silicated glass | 96.3 | 2.9 | 0.4 | <0.2 | <0.2 |

As the silane compound, the silane compounds represented by the following formula may be used:

$$X\text{-}Si(CH_3)_{3-n}(OR)_n$$

wherein n denotes an integer of 2 or 3; X represents a functional group which can be bound with an organic matrix resin with the functional group being a vinyl group, a methacryl group, an epoxy group, an amino group, and a mercapto group; and R represents an alkyl group. The alkoxy group-OR is converted into a silanol by hydrolysis with a OH group, which is bound with a carbon particle, to bind the activated carbon particles firmly with the blended resin.

As the aforementioned binder component, at least one compound selected from a thermosetting resin, coal tar, mesophase, and thermoplastic resin may be used.

Examples of compounds used as the thermosetting resin include a resol-type phenol resin, novolac-type phenol resin, formaldehyde-type resin, polyimide, unsaturated polyester, bismaleimde-type polyimide, polycyanate, thermosetting polyphenylene ether (PPE) and polyphenylene oxide (PPO).

The mesophase is an intermediate between an organic compound and a graphite material, the intermediate being a sort of liquid crystal form.

Besides the above components, a thermoplastic resin is preferably added and mixed. The addition of the thermoplastic resin enables it possible to maintain high shape stability in the molding operation and to mold in an efficient manner even if the proportion of the activated carbon is as high as 50% by weight or more.

Examples of compounds used as the thermoplastic resin include a olefin-type polymer such as polyethylene (PE) and polypropylene (PP), a vinyl-type polimer such as acryl resin, butyral resin, and polystyrene, polyacetal resin, and A ester-type resin such as polyethylene terephthalate (PET), polycarbonate (PC). Each of these thermoplastic resins is added in a proportion ranging 0 to 60 parts by weight, preferably from 5 to 30 parts by weight for 100 parts by weight of the total amount of the activated carbon, thermosetting resin, and the like.

The solid activated carbon of the present invention can be made into products with various forms; it is formed into a sheet to be used as an activated carbon substrate, or into a block by press forming, or into a rod or cylinder by extrusion.

As the method for forming a sheet material, a doctor blade method, rolling method, or calendar rolling method may be used. The resulting sheet compact is cut into sheets having a desired form by punching and the sheets are heat-treated at 200 to 400° C. in an oxidizing atmosphere to cure the thermoplastic resin. The heat treated sheets may be then heat-treated at 600 to 1,100° C., preferably 700 to 900° C., in a non-oxidizing atmosphere.

In the solid activated carbon of the present invention, Si finally exists in the form of glass between the activated carbon particles to increase the binding strength between the particles thereby improving the strength of the product. When the amount of Si contained in the solid activated carbon is measured, a sample of the solid activated carbon is alkali-fused using boric acid and sodium carbonate. The fused product is dissolved in a hydrochloric acid solution to measure Si in the solution quantitatively using an ICP quantometer (for example, ICP quantometer SPS1200VR, manufactured by Seiko Electronic Industry Ltd.).

The present invention also resides in an electric double layer capacitor using the above-mentioned solid activated carbon as an electrode. Because the solid activated carbon has high strength so that it prevents damages to the capacitor during handling, increases the capacitance and reduces the internal resistance of the capacitor.

A third embodiment of the present invention directs to an application of the solid activated carbon to a polarizable electrode of an electric double layer capacitor. Making use of the feature that the solid activated carbon has a large specific surface area, it is utilized for a polarizable electrode having a large capacitance, exhibiting the following characteristics.

The solid activated carbon used for the polarizable electrode has the characteristics in which the distribution of pore sizes calculated from the argon absorption isotherm of the solid activated carbon is designed in such a manner that the ratio of the volume of the pores with a size of 15 angstroms or less is 65% or more for the total volume of pores and the pore size giving the maximum differential pore volume is 8 angstroms or less.

The solid activated carbon used for the polarizable electrode has the characteristics in which the distribution of pore sizes calculated from the argon absorption isotherm according to a Horvath-Kawazoe method (HK method) is designed in such a manner that the ratio of the volume of the pores with a size of 15 angstroms or less is 65% or more for the total volume of pores and in which the capacitance per unit volume at a current density as low as 30 $mA/cm^2$ is 20 $F/cm^3$ or more.

As for the capacitance which is measured according to a constant-current discharge method, a solid activated carbon of which the capacitance at a current density as low as 30 $mA/cm^2$ is 40% or more of that at a current density as high as 300 $mA/cm^2$ is preferably used.

As aforementioned, the solid activated carbon of the present invention is characterized in that the ratio of the volume of the pores with a size of 15 angstroms or less is 65% or more for the total volume of pores in the distribution of pore sizes calculated from the argon absorption isotherm according to a Horvath-kawazoe method (HK method) and the capacitance per unit volume at a current density as low as 30 $mA/cm^2$ is 20 F/cc or more. Many pores traps sulfuric acid ions in an electrolyte and the pore size of 15 angstroms is adequate to trap the sulfuric acid ion with a size of about 3 angstroms and thus the solid activated carbon is considered to have a high capacitance. As a consequence, a solid activated carbon having a high capacitance at the time of discharging at a low current and exhibiting high mechanical strength and durability can be produced.

When the solid activated carbon is applied to the polarizable electrode used for the electric double layer capacitor, in turn, a smaller sized electric double layer capacitor can be obtained which has a high proportion of activated carbon and hence a practical capacitance as well as a simple structure, high efficiency and excellent durability.

The solid activated carbon of the present invention comprises an activated carbon powder or an activated fiber or an activated carbon powder and an activated carbon fiber, and a carburized substance resulted from the heat-treatment of a known carburizable resin added as a binder. As a polarizable electrode of the electric double layer capacitor, such a solid activated carbon is unsuitable which has the features in that the ratio of the volume of the pores with a size of 15 angstroms or less is less than 65% for the total volume of pores in the distribution of pore sizes calculated from the argon absorption isotherm (HK method) or the capacitance per unit volume at a current density as low as 30 mA/cm$^2$ is less than 20 F/cm$^3$.

Therefore, it is necessary that the ratio of the volume of the pores with a size of 15 angstroms or less is 65% or more for the total volume of pores in the distribution of pore sizes calculated from the argon absorption isotherm (HK method) and the capacitance per unit volume at a current density as low as 30 mA/cm$^2$ is 20 F/cm$^3$ or more. It is desirable to use a solid activated carbon having a specific surface area of 1,500 to 2,500 m$^2$/g, especially in the case where it is used for the polarizable electrode for the electric double layer capacitance. When the activated carbon fiber is used, those having a fiber diameter of 6 to 18 μm and a specific surface area of 1,000 to 2,500 m$^2$/g are preferred.

No particular limitations is imposed on the carburizable resin added as a binder and any material can be applied insofar as it is a known organic resin. Phenol or teflon, coal tar, or polyvinylbutyral resin or the like is preferred.

An embodiment of the process for manufacturing the solid activated carbon will be explained.

To 100 parts by weight of an activated carbon powder and/or an activated carbon fiber is added 20–200 parts by weight of at least one compound of known carburizable resins such as phenol resin or teflon resin, coal tar, or polyvinylbutyral (PVB) resin and the both are mixed. A slurry or a granular material of the mixture is prepared to make a molding material. The molding material is molded using a known molding method such as a doctor blade method, tape molding method, or compression molding method, rolling method, or combinations of these methods to form a molded compact, which is then aged at 150 to 300° C. prior to heat-treatment for carburization.

The aging ensures that the strength of the solid activated carbon can be kept high by addition of only a small amount of the carburizable resin and the pores of the activated carbon can be blocked with difficulty to prevent a reduction in the specific surface area, thereby maximally bringing out the qualities of the activated carbon.

Next, the above aged compact is heat-treated in a non-oxidizing atmosphere to carburize the carburizable resin contained in the molded compact and at the same time to calcine the activated carbon powder and/or the activated carbon fiber and the carburized substance of the carburizable resin thereby combining the both to obtain a solid activated carbon.

The temperature for the heat-treatment is preferably from 600 to 1,200° C., most preferably from 700 to 900° C. to promote sufficiently the carburization of the carburizable resin and to advance calcination of the neck portion of the activated carbon powder or fiber thereby imparting sufficient strength to the solid activated carbon.

A high temperature and a long reaction time in the above carburizing treatment improve the strength of the solid activated carbon, but reduce the total volume of pores and increase the pore size giving the maximum differential pore volume and hence the capacitance at the time of discharging at both low and high current densities decreases. It is essential to select carburizing conditions bringing about an adequate pore distribution in consideration of the balance between the strength and the capacitance according to use.

The solid activated carbon of the present invention can be made into products with various forms; it is formed into a sheet material to be used as an activated carbon substrate using a doctor blade method, calendar rolling method, or the like, into a block material using various press forming methods, or into a rod or cylinder material using an extruding method; or it is formed into various products using the combinations of the above methods.

In addition, after a plurality of the above sheet compacts are laminated, these may be heat-treated in a non-oxidizing atmosphere. It is also possible to laminate a plurality of the sheet compacts, which are then bonded by thermocompression or bound using an adhesive liquid or an adhesive, which serves to balance the directions of warpage of the sheets thereby reducing the occurrence of warpage during heating.

While, in the case where the ratio of the volume of the pores with a size of 15 angstroms or less is 65% or more for the total volume of pores, but the pore size giving the maximum differential pore volume (cm$^3$/g-angstrom) in the distribution of pore sizes calculated from the argon absorption isotherm (HK method) exceeds 8 angstroms, the solid activated carbon having such characteristics cannot be applied to electrode materials for various batteries used as auxiliary power sources even if the capacitance at the time of discharging at a low current is high.

It is therefore necessary that, in the distribution of pore sizes calculated from the argon absorption isotherm (HK method), the ratio of the volume of the pores with a size of 15 angstroms or less is 65% or more for the total volume of pores and the pore size giving the maximum differential pore volume (cm$^3$/g-angstrom) is 8 angstroms or less.

In the solid activated carbon of the present invention, there are no particular limitations to materials used for the activated carbon powder and activated carbon fiber as the raw materials and any of coconut husk-types, coal-types, and ligneous types may be used. Among these, coconut husk-types are most preferable in view of cost and adsorption.

Incidentally, the specific surface area of the activated carbon powder as the raw material is selected according to the objective capacitance.

EXAMPLES

The present invention will be explained in more detail by way of examples, which are not intended to be limiting of the present invention.

Example 1

First, to 100 parts by weight of a coconut husk-type activated carbon powder having a BET value of 2,000 m$^2$/g were added PVB and mesophase in the proportions shown in Table 2 to prepare various compositions. Each composition was stirred using a high speed mixing stirrer to prepare powder, which was successively screened using a 40 mesh screen to produce a molding raw material.

Next, the molding raw material was molded by press molding or roll molding to prepare a plate molded compact.

The molded compact was treated by aging in air in the conditions of temperature and holding time as shown in Table 2 and was then calcined in vacuum at the temperature shown in Table 2 to carburize PVB and mesophase and to produce an activated carbon substrate for evaluation which is a complex of activated carbon and carbon, having a size of 70 mm length, 50 mm width and 1 mm thickness.

For comparative examples, activated carbon substrates were prepared using an acryl-type resin in place of PVB in the same manner as above.

TABLE 2

| Sample number | Composition (parts by weight) | | Aging | | Remarks |
|---|---|---|---|---|---|
| | PVB | Mesophase | Temperature (° C.) | Time (hr.) | |
| *1 | 15 | — | 200 | 48 | |
| 2 | 20 | — | 200 | 48 | |
| 3 | 30 | — | 200 | 48 | |
| 4 | 50 | — | 200 | 48 | |
| 5 | 100 | — | 200 | 48 | |
| 6 | 150 | — | 200 | 48 | |
| 7 | 200 | — | 200 | 48 | |
| *8 | 250 | — | 200 | 48 | Deformed by aging |
| *9 | 100 | — | 100 | 48 | |
| 10 | 100 | — | 150 | 48 | |
| 11 | 100 | — | 200 | 72 | |
| 12 | 100 | — | 250 | 12 | |
| 13 | 100 | — | 250 | 24 | |
| 14 | 100 | — | 300 | 2 | |
| *15 | 100 | — | 350 | 2 | |
| 16 | 100 | — | 200 | 48 | |
| 17 | 100 | — | 200 | 48 | |
| 18 | 100 | — | 200 | 48 | |
| 19 | 100 | — | 200 | 48 | |
| 20 | 100 | — | 200 | 48 | |
| *21 | 100 | — | 200 | 48 | |
| 22 | 100 | 5 | 200 | 48 | |
| 23 | 100 | 20 | 200 | 48 | |
| 24 | 100 | 40 | 200 | 48 | |
| 25 | 100 | 60 | 200 | 48 | |
| 26 | 100 | 80 | 200 | 48 | |
| 27 | 100 | 100 | 200 | 48 | |
| 28 | 100 | 120 | 200 | 48 | |
| 29 | 100 | 20 | 200 | 48 | |
| 30 | 100 | 20 | 200 | 48 | |
| *31 | 100 | — | — | — | |
| *32 | 100 | 20 | — | — | |
| *33 | — | — | 200 | 48 | Comparative Example |

Sample numbers with the symbol (*) are out of the claim of the present invention.

The activated carbon substrate for evaluation obtained in this manner was subjected to Fourier transform infrared spectroscopic analysis (FT-IR) to confirm the presence of PVB in the activated carbon substrate. Thermogravimetric analysis and differential thermal analysis (TG-DTA) were also performed using a thermal analysis apparatus in a temperature range of room temperature to 1,200° C. to calculate the content of residual PVB in the activated carbon substrate.

The three-point bending strength of the activated carbon substrate was measured according to the JIS-R-1601 standard.

Next, the activated carbon substrate for evaluation was used as an electrode and charge and discharge operations were performed in 33% aqueous sulfuric acid solution to calculate the capacitance (F/g) per unit weight of the electrode.

TABLE 3

| Sample number | PVB | | Bending strength (g/mm$^2$) | Capacitance (F/g) | Remarks |
|---|---|---|---|---|---|
| | Presence of detection | Content (Parts by weight) | | | |
| *1 | Present | 4.3 | 90 | 71.2 | Molded compact layer inferior was observed. |
| 2 | ditto | 5.8 | 300 | 69.9 | |
| 3 | ditto | 8.7 | 385 | 69.1 | |
| 4 | ditto | 15.0 | 499 | 68.5 | |
| 5 | ditto | 31.0 | 657 | 65.4 | |
| 6 | ditto | 48.0 | 725 | 60.1 | |
| 7 | ditto | 64.0 | 998 | 53.8 | |
| *8 | ditto | 72.5 | — | — | Deformed by aging |
| *9 | ditto | 2.0 | 20 | 72.5 | Handling inferior |
| 10 | ditto | 30.0 | 632 | 65.3 | |
| 11 | ditto | 32.0 | 679 | 64.4 | |
| 12 | ditto | 28.0 | 553 | 65.0 | |
| 13 | ditto | 29.0 | 593 | 62.9 | |
| 14 | ditto | 29.0 | 600 | 63.7 | |
| *15 | ditto | 4.2 | 85 | 71.2 | Handling inferior |
| 16 | ditto | 35.0 | 498 | 69.1 | |
| 17 | ditto | 32.0 | 600 | 65.2 | |
| 18 | ditto | 30.0 | 718 | 60.3 | |
| 19 | ditto | 25.2 | 965 | 54.5 | |
| 20 | ditto | 20.1 | 887 | 45.6 | |
| *21 | ditto | 5.5 | 115 | 21.3 | Capacitance shortage |
| 22 | ditto | 31.0 | 823 | 74.5 | |
| 23 | ditto | 31.0 | 919 | 73.4 | |
| 24 | ditto | 31.0 | 1233 | 67.2 | |
| 25 | ditto | 31.0 | 1335 | 56.3 | |
| 26 | ditto | 31.0 | 1441 | 54.5 | |
| 27 | ditto | 31.0 | 1582 | 51.0 | |
| 28 | ditto | 31.0 | 1787 | 44.8 | |
| 29 | ditto | 30.0 | 1089 | 73.0 | |
| 30 | ditto | 30.0 | 1108 | 72.5 | |
| *31 | Absent | 0 | — | — | Measurement was impossible. |
| *32 | ditto | 0 | 12 | — | Handling inferior |
| *33 | ditto | 0 | — | — | Comparative Example, measurement was impossible. |

Sample numbers with the symbol (*) are out of the claim of the present invention.

The actual resistance of the above electrode was measured at 1 kHz. As a result, the resistance of the electrodes according to the present invention were all 5Ω or less whereas the resistance of the sample No. 33 and the sample Nos. 31 and 32 in which no residual PVB was observed could not be measured.

Table 3 shows the above results: the sample No. 33 which was the comparative example: the bending strength and the capacitance could not be measured; the samples of Nos. 1, 9, 15, 32 which were out of the Claim of the present invention: the bending strength was as low as 90 g/mm$^2$ or less, a layer inferior occurred in the molded compact, and the strength of the substrate is low with poor handling characteristics; the sample of No. 8: it was deformed by aging; and the sample of No. 21: the capacitance was as low as 21.3 F/g. All of these samples were therefore not practical.

On the contrary, all of the samples according to the present invention had the satisfactory characteristics as the solid activated carbon in which the bending strength was 300 g/mm$^2$ or more and the capacitance was 44.8 F/g or more which was in a practical range.

It was also found that addition of a small amount of mesophase carbon besides PVB to the activated carbon powder furthermore improve the strength of the substrate. It was also clarified that substrates having various qualities were obtained by controlling the amount of mesophase carbon according to the desired capacitance and substrate strength.

As was illustrated in detail, according to the solid activated carbon and the process for manufacturing the solid activated carbon of the present invention, activated carbon substrates can be manufactured, which has large capacity, mechanical strength and capacitance. Hence volumetrically small size for a fixed space can be realized and molding and heat-treating processes can be easily performed in a stable manner. Particularly, a solid activated carbon which may be preferably used as electrode materials etc. for electric double layer capacitors and various batteries needing a high porosity, durability, and mechanical strength can be mass-produced.

When the solid activated carbon of the present invention is used for a polarizable electrode, the surface area which, as the electrode, is in contact with an electrolyte increases and electric paths through which electric charges pass also increases. Therefore, a small-sized electric double layer capacitor can be manufactured which has practical capacitance with a simple structure and high efficiency, exhibiting excellent durability.

Example 2

Activated carbon powder (husk-type, BET value: 2,000 $m^2/g$) and PVB were formulated in the proportions shown in Table 4 to prepare various compositions. Each composition was stirred using a high speed mixing stirrer to prepare a powder, which was allowed to pass through a 40 mesh screen to produce a molding raw material.

The specific surface area of the above activated carbon powder is preferably in a range from 1,500 $m^2/g$ to 2,500 $m^2/g$ for use as the electrode 1 of the simplified double layer capacitor though it may be determined according to the objective capacitance and there are no limitations to it. In addition, though any polyvinyl butyral may be used as the above polyvinyl butyral (PVB), if it is commercially available, those having a polymerization degree of 1,500 or less are desirable since a polymerization degree exceeding 1,500 impairs the molding characteristics during dry molding.

The resulting powder was molded by dry press molding or dry roll molding to prepare a molded compact with a size of 70 mm length, 50 mm width and 1 mm thickness. The molding temperature in this step was in a range from room temperature to 60° C. The reason why the molding temperature was limited is that if the temperature exceeds 60° C., the molded compact adheres considerably to a mold and a roll, which hinders continuous forming operation. The molded compact was aged in air in the conditions of temperature and holding time as shown in Table 4 and was then heat-treated in vacuum at the temperature shown in Table 4 to carburize PVB to produce an activated carbon substrate which is a complex of activated carbon and carbon.

The capacitance of the resulting solid activated carbon substrate was measured when it is used as the electrode 1 of the simplified double layer capacitor shown in FIG. 1. The apparent density, three-point bending strength defined in JIS, and specific surface area (BET method) of the resulting solid activated carbon substrate were also measured. The results are shown in Table 4.

From these results, when the amount of PVB was less than 30 parts by weight (sample No.1), the handling characteristics were impaired since the apparent density and the strength were low whereas when the amount exceeded 200 parts by weight (sample No. 23), cracks or deformation occurred by aging, requiring after-treatment to deliver as a final product. The samples produced in the conditions that the aging was not performed (sample No.4) or the aging temperature was less than 150° C. (sample No.5) or exceeded 300° C. (sample No.20) had low strength. When the heat-treating temperature was less than 600° C. (sample No.9), the apparent density was low whereas when the heat-treating temperature exceeded 1,200° C. (sample No.14), the calcination of the activated carbon itself proceeded whereby the pores of the activated carbon itself were crushed bringing about a reduction in the specific surface area and thus reduced capacitance resulted.

It is therefore clear that if the amount of PVB falls in a range from 30 to 200 parts by weight, the aging temperature in a range from 150 to 300° C., and the heat-treating temperature in a range from 600 to 1,200° C., the apparent density, three-point bending strength, and specific surface area of the resulting solid activated carbon can be as large as 0.5 $g/cm^3$ or more, 300 $gf/mm^2$ or more, and 500 $m^2/g$ or more respectively.

TABLE 4

| No. | Proportion (parts by weight) | | Aging ° C.-time | Heat-treating temperature ° C. | Capacitance F/g | Apparent density $g/cm^3$ | Three-point bending strength $gf/mm^2$ | Specific surface area $m^2/g$ |
| --- | --- | --- | --- | --- | --- | --- | --- | --- |
| | Activated carbon | PVB | | | | | | |
| 1 | 100 | 20 | 200-48 | 800 | 69 | 0.45 | 285 | 1599 |
| 2 | 100 | 30 | 200-48 | 800 | 69 | 0.50 | 351 | 1578 |
| 3 | 100 | 50 | 200-48 | 800 | 68 | 0.51 | 412 | 1564 |
| 4 | 100 | 100 | None | 800 | 64 | 0.49 | 241 | 1529 |
| 5 | 100 | 100 | 140-48 | 800 | 63 | 0.51 | 290 | 1520 |
| 6 | 100 | 100 | 150-48 | 800 | 63 | 0.52 | 431 | 1527 |
| 7 | 100 | 100 | 150-72 | 800 | 63 | 0.48 | 841 | 1534 |
| 8 | 100 | 100 | 200-24 | 800 | 65 | 0.52 | 443 | 1541 |
| 9 | 100 | 100 | 200-48 | 500 | 72 | 0.48 | 411 | 1603 |
| 10 | 100 | 100 | 200-48 | 600 | 69 | 0.55 | 547 | 1577 |
| 11 | 100 | 100 | 200-48 | 800 | 63 | 0.59 | 891 | 1523 |
| 12 | 100 | 100 | 200-48 | 1000 | 52 | 0.65 | 1011 | 1355 |
| 13 | 100 | 100 | 200-48 | 1200 | 41 | 0.64 | 1052 | 980 |
| 14 | 100 | 100 | 200-48 | 1300 | 21 | 0.62 | 1023 | 631 |

TABLE 4-continued

| No. | Proportion (parts by weight) Activated carbon | PVB | Aging °C.-time | Heat-treating temperature °C. | Capacitance F/g | Apparent density g/cm³ | Three-point bending strength gf/mm² | Specific surface area m²/g |
|---|---|---|---|---|---|---|---|---|
| 15 | 100 | 100 | 200-72 | 800 | 64 | 0.57 | 753 | 1529 |
| 16 | 100 | 100 | 250-12 | 800 | 65 | 0.51 | 521 | 1533 |
| 17 | 100 | 100 | 250-24 | 800 | 62 | 0.51 | 347 | 1512 |
| 18 | 100 | 100 | 300-24 | 800 | 63 | 0.51 | 341 | 1525 |
| 19 | 100 | 100 | 300-48 | 800 | 62 | 0.50 | 321 | 1512 |
| 20 | 100 | 100 | 310-24 | 800 | 62 | 0.51 | 253 | 1514 |
| 21 | 100 | 150 | 200-48 | 800 | 59 | 0.64 | 1011 | 1476 |
| 22 | 100 | 200 | 200-48 | 800 | 51 | 0.70 | 1211 | 1311 |
| 23 | 100 | 250 | 200-48 | Deformed by aging | | | | |

Example 3

Activated carbon powder (husk-type, BET value: 2,000 m²/g), PVB, and mesophase carbon were formulated in the proportions shown in Tables 5–11 to prepare various compositions. Each composition was stirred using a high speed mixing stirrer to prepare a powder, which was allowed to pass through a 40 mesh screen to produce a molding raw material.

The specific surface area of the above activated carbon powder is preferably in a range from 1,500 m²/g to 2,500 m²/g for use as the electrode 1 of the simplified double layer capacitor though it may be determined according to the objective capacitance and there are no limitations to it. In addition, though any PVB may be used as the above PVB, if it is commercially available, those having a polymerization degree of 1,500 or less are desirable since a polymerization degree exceeding 1,500 impairs the molding characteristics during dry molding.

The resulting powder was molded by dry press molding or dry roll molding to prepare a molded compact with a size of 70 mm length, 50 mm width and 1 mm thickness. The molding temperature in this step was in a range from room temperature to 60° C. The reason why the molding temperature was limited is that if the temperature exceeds 60° C., the molded compact adheres considerably to a die and a roll, which hinders continuous forming operation. The molded compact was aged in air at the temperature shown in Tables 5–11 for 48 hours and was then heat-treated in vacuum at the temperature shown in Tables 5–11 to carburize PVB and mesophase carbon to produce an activated carbon substrate which is a complex of activated carbon and carbon.

The capacitance of the resulting solid activated carbon substrate was measured when it is used as the electrode 1 of the simplified double layer capacitor shown in FIG. 1. The apparent density, three-point bending strength defined in JIS, and specific surface area (BET method) of the resulting solid activated carbon substrate were also measured. The results are shown in Tables 5–11.

From these results, it was found that additions of 30–200 parts by weight of PVB and further of 100 parts by weight or less of mesophase carbon to the activated carbon powder more improve the strength of the substrate. It was also clarified that solid activated carbon having various qualities were obtained by controlling the amount of mesophase carbon to match capacitance and strength required.

Similarly to Example 2, it is clear that if the amount of PVB falls in a range from 30 to 200 parts by weight, the aging temperature in a range from 150 to 300° C., and the heat-treating temperature in a range from 600 to 1,200° C. (samples No.1 to No.108 in Tables 5–9), the apparent density, three-point bending strength, and specific surface area of the resulting solid activated carbon can be as large as 0.5 g/cm³ or more, 300 gf/mm² or more, and 500 m²/g or more respectively. When the conditions of the sample are out of the above ranges (samples No.109 to No.141 in Tables 10 and 11), any one of the characteristics is impaired.

TABLE 5

| No. | Proportion (parts by weight) | | | Aging °C.-time | Heat-trating temperature °C. | Capacitance F/g | Apparent density g/cm³ | Three-point bending strength gf/cm² | Specific surface m²/g |
| | Activated carbon | PVB | Mesophase carbon | | | | | | |
|---|---|---|---|---|---|---|---|---|---|
| 1 | 100 | 30 | 0 | 150 | 600 | 69 | 0.50 | 312 | 1505 |
| 2 | 100 | 30 | 0 | 150 | 800 | 67 | 0.51 | 324 | 1560 |
| 3 | 100 | 30 | 0 | 150 | 1000 | 60 | 0.53 | 640 | 1595 |
| 4 | 100 | 30 | 0 | 150 | 1200 | 51 | 0.56 | 780 | 1050 |
| 5 | 100 | 30 | 0 | 200 | 600 | 70 | 0.50 | 338 | 1610 |
| 6 | 100 | 30 | 0 | 200 | 800 | 86 | 0.52 | 843 | 1520 |
| 7 | 100 | 30 | 0 | 200 | 1000 | 55 | 0.54 | 892 | 1120 |
| 8 | 100 | 30 | 0 | 200 | 1200 | 47 | 0.58 | 1005 | 880 |
| 9 | 100 | 30 | 0 | 300 | 600 | 88 | 0.51 | 321 | 1577 |
| 10 | 100 | 30 | 0 | 300 | 800 | 66 | 0.52 | 343 | 1525 |
| 11 | 100 | 30 | 0 | 300 | 1000 | 54 | 0.54 | 881 | 1098 |
| 12 | 100 | 30 | 0 | 300 | 1200 | 48 | 0.58 | 1023 | 921 |

TABLE 5-continued

| | Proportion (parts by weight) | | | | Heat-trating | | | Three-point | |
|---|---|---|---|---|---|---|---|---|---|
| No. | Activated carbon | PVB | Mesophase carbon | Aging °C.-time | temperature °C. | Capacitance F/g | Apparent density g/cm$^3$ | bending strength gf/cm$^2$ | Specific surface m$^2$/g |
| 13 | 100 | 30 | 50 | 150 | 600 | 52 | 0.64 | 354 | 1054 |
| 14 | 100 | 30 | 50 | 150 | 800 | 49 | 0.67 | 362 | 954 |
| 15 | 100 | 30 | 50 | 150 | 1000 | 40 | 0.69 | 453 | 721 |
| 16 | 100 | 30 | 50 | 150 | 1200 | 36 | 0.71 | 794 | 673 |
| 17 | 100 | 30 | 50 | 200 | 600 | 50 | 0.63 | 421 | 971 |
| 18 | 100 | 30 | 50 | 200 | 800 | 48 | 0.66 | 800 | 891 |
| 19 | 100 | 30 | 50 | 200 | 1000 | 41 | 0.70 | 1213 | 742 |
| 20 | 100 | 30 | 50 | 200 | 1200 | 35 | 0.74 | 1410 | 652 |
| 21 | 100 | 30 | 50 | 300 | 600 | 48 | 0.67 | 512 | 941 |
| 22 | 100 | 30 | 50 | 300 | 800 | 49 | 0.66 | 505 | 859 |
| 23 | 100 | 30 | 50 | 300 | 1000 | 42 | 0.69 | 1070 | 753 |
| 24 | 100 | 30 | 50 | 300 | 1200 | 37 | 0.71 | 1205 | 678 |

TABLE 6

| | Proportion (parts by weight) | | | | Heat-trating | | | Three-point | |
|---|---|---|---|---|---|---|---|---|---|
| No. | Activated carbon | PVB | Mesophase carbon | Aging °C. | temperature °C. | Capacitance F/g | Apparent density g/cm$^3$ | bending strength gf/cm$^2$ | Specific surface m$^2$/g |
| 25 | 100 | 30 | 100 | 150 | 600 | 47 | 0.74 | 521 | 867 |
| 26 | 100 | 30 | 100 | 150 | 800 | 42 | 0.76 | 548 | 753 |
| 27 | 100 | 30 | 100 | 150 | 1000 | 32 | 0.75 | 1020 | 577 |
| 28 | 100 | 30 | 100 | 150 | 1200 | 27 | 0.76 | 925 | 543 |
| 29 | 100 | 30 | 100 | 200 | 600 | 40 | 0.76 | 609 | 715 |
| 30 | 100 | 30 | 100 | 200 | 800 | 37 | 0.80 | 998 | 674 |
| 31 | 100 | 30 | 100 | 200 | 1000 | 30 | 0.79 | 1032 | 570 |
| 32 | 100 | 30 | 100 | 200 | 1200 | 25 | 0.84 | 1439 | 523 |
| 33 | 100 | 30 | 100 | 300 | 600 | 39 | 0.75 | 610 | 698 |
| 34 | 100 | 30 | 100 | 300 | 800 | 41 | 0.76 | 640 | 723 |
| 35 | 100 | 30 | 100 | 300 | 1000 | 30 | 0.71 | 897 | 570 |
| 36 | 100 | 30 | 100 | 300 | 1200 | 25 | 0.82 | 1001 | 520 |
| 37 | 100 | 100 | 0 | 150 | 600 | 68 | 0.51 | 330 | 1588 |
| 38 | 100 | 100 | 0 | 150 | 800 | 64 | 0.52 | 347 | 1475 |
| 39 | 100 | 100 | 0 | 150 | 1000 | 54 | 0.54 | 871 | 1080 |
| 40 | 100 | 100 | 0 | 150 | 1200 | 44 | 0.58 | 1057 | 795 |
| 41 | 100 | 100 | 0 | 200 | 600 | 69 | 0.51 | 358 | 1597 |
| 42 | 100 | 100 | 0 | 200 | 800 | 65 | 0.52 | 637 | 1481 |
| 43 | 100 | 100 | 0 | 200 | 1000 | 54 | 0.55 | 965 | 1101 |
| 44 | 100 | 100 | 0 | 200 | 1200 | 45 | 0.58 | 1150 | 810 |
| 45 | 100 | 100 | 0 | 300 | 600 | 67 | 0.52 | 361 | 1542 |
| 46 | 100 | 100 | 0 | 300 | 800 | 66 | 0.52 | 872 | 1511 |
| 47 | 100 | 100 | 0 | 300 | 1000 | 51 | 0.55 | 883 | 992 |
| 48 | 100 | 100 | 0 | 300 | 1200 | 42 | 0.60 | 1114 | 742 |

TABLE 7

| | Proportion (parts by weight) | | | | Heat-trating | | | Three-point | |
|---|---|---|---|---|---|---|---|---|---|
| No. | Activated carbon | PVB | Mesophase carbon | Aging °C.-time | temperature °C. | Capacitance F/g | Apparent density g/cm$^3$ | bending strength gf/cm$^2$ | Specific surface m$^2$/g |
| 49 | 100 | 100 | 50 | 150 | 600 | 50 | 0.64 | 355 | 970 |
| 50 | 100 | 100 | 50 | 150 | 800 | 45 | 0.66 | 371 | 811 |

TABLE 7-continued

| | Proportion (parts by weight) | | | Aging °C.-time | Heat-trating temperature °C. | Capacitance F/g | Apparent density g/cm³ | Three-point bending strength gf/cm² | Specific surface m²/g |
|---|---|---|---|---|---|---|---|---|---|
| No. | Activated carbon | PVB | Mesophase carbon | | | | | | |
| 51 | 100 | 100 | 50 | 150 | 1000 | 37 | 0.67 | 471 | 687 |
| 52 | 100 | 100 | 50 | 150 | 1200 | 35 | 0.71 | 813 | 650 |
| 53 | 100 | 100 | 50 | 200 | 600 | 49 | 0.65 | 481 | 950 |
| 54 | 100 | 100 | 50 | 200 | 800 | 47 | 0.65 | 792 | 872 |
| 55 | 100 | 100 | 50 | 200 | 1000 | 38 | 0.69 | 1200 | 681 |
| 56 | 100 | 100 | 50 | 200 | 1200 | 34 | 0.75 | 1450 | 644 |
| 57 | 100 | 100 | 50 | 300 | 600 | 45 | 0.66 | 492 | 810 |
| 58 | 100 | 100 | 50 | 100 | 800 | 47 | 0.68 | 785 | 881 |
| 59 | 100 | 100 | 50 | 300 | 1000 | 41 | 0.70 | 1192 | 721 |
| 60 | 100 | 100 | 50 | 300 | 1200 | 32 | 0.75 | 1250 | 594 |
| 61 | 100 | 100 | 100 | 150 | 600 | 45 | 0.72 | 547 | 805 |
| 62 | 100 | 100 | 100 | 150 | 800 | 41 | 0.77 | 879 | 731 |
| 63 | 100 | 100 | 100 | 150 | 1000 | 28 | 0.76 | 1041 | 532 |
| 64 | 100 | 100 | 100 | 150 | 1200 | 25 | 0.81 | 1420 | 522 |
| 65 | 100 | 100 | 100 | 200 | 600 | 38 | 0.76 | 923 | 692 |
| 66 | 100 | 100 | 100 | 200 | 800 | 35 | 0.79 | 1042 | 645 |
| 67 | 100 | 100 | 100 | 200 | 1000 | 27 | 0.78 | 1350 | 540 |
| 68 | 100 | 100 | 100 | 200 | 1200 | 24 | 0.87 | 1820 | 515 |
| 69 | 100 | 100 | 100 | 300 | 600 | 37 | 0.76 | 635 | 710 |
| 70 | 100 | 100 | 100 | 300 | 800 | 41 | 0.78 | 953 | 734 |
| 71 | 100 | 100 | 100 | 300 | 1000 | 29 | 0.72 | 1224 | 541 |
| 72 | 100 | 100 | 100 | 300 | 1200 | 24 | 0.84 | 1543 | 513 |

TABLE 8

| | Proportion (parts by weight) | | | Aging °C.-time | Heat-trating temperature °C. | Capacitance F/g | Apparent density g/cm³ | Three-point bending strength gf/cm² | Specific surface m²/g |
|---|---|---|---|---|---|---|---|---|---|
| No. | Activated carbon | PVB | Mesophase carbon | | | | | | |
| 73 | 100 | 200 | 0 | 150 | 600 | 65 | 0.55 | 879 | 1495 |
| 74 | 100 | 200 | 0 | 150 | 800 | 60 | 0.56 | 908 | 1237 |
| 75 | 100 | 200 | 0 | 150 | 1000 | 51 | 0.58 | 1100 | 992 |
| 76 | 100 | 200 | 0 | 150 | 1200 | 40 | 0.60 | 1240 | 726 |
| 77 | 100 | 200 | 0 | 200 | 600 | 66 | 0.54 | 844 | 1503 |
| 78 | 100 | 200 | 0 | 200 | 800 | 62 | 0.42 | 743 | 1275 |
| 79 | 100 | 200 | 0 | 200 | 100 | 58 | 0.57 | 1087 | 1042 |
| 80 | 100 | 200 | 0 | 200 | 1200 | 42 | 0.59 | 1191 | 743 |
| 81 | 100 | 200 | 0 | 300 | 600 | 64 | 0.55 | 908 | 1381 |
| 82 | 100 | 200 | 0 | 300 | 800 | 60 | 0.56 | 1025 | 1258 |
| 83 | 100 | 200 | 0 | 300 | 1000 | 51 | 0.58 | 1174 | 1005 |
| 84 | 100 | 200 | 0 | 300 | 1200 | 40 | 0.61 | 1293 | 752 |
| 85 | 100 | 200 | 50 | 150 | 600 | 47 | 0.65 | 932 | 917 |
| 86 | 100 | 200 | 50 | 150 | 800 | 41 | 0.71 | 945 | 735 |
| 87 | 100 | 200 | 50 | 150 | 1000 | 34 | 0.75 | 1213 | 614 |
| 88 | 100 | 200 | 50 | 150 | 1200 | 32 | 0.76 | 1245 | 574 |
| 89 | 100 | 200 | 50 | 200 | 600 | 47 | 0.64 | 913 | 900 |
| 90 | 100 | 200 | 50 | 200 | 800 | 44 | 0.53 | 391 | 801 |
| 91 | 100 | 200 | 50 | 200 | 1000 | 34 | 0.74 | 1256 | 625 |
| 92 | 100 | 200 | 50 | 200 | 1200 | 31 | 0.76 | 1298 | 571 |
| 93 | 100 | 200 | 50 | 300 | 600 | 42 | 0.65 | 917 | 739 |
| 94 | 100 | 200 | 50 | 300 | 800 | 43 | 0.68 | 1005 | 768 |
| 95 | 100 | 200 | 50 | 300 | 1000 | 33 | 0.76 | 1223 | 603 |
| 96 | 100 | 200 | 50 | 300 | 1200 | 27 | 0.80 | 1568 | 545 |

TABLE 9

| No. | Proportion (parts by weight) Activated carbon | PVB | Meso-phase carbon | Aging ° C. | Heat-trating temperature ° C. | Capacitance F/g | Apparent density g/cm$^3$ | Three-point bending strength gf/cm$^2$ | Specific surface m$^2$/g |
|---|---|---|---|---|---|---|---|---|---|
| 97  | 100 | 200 | 100 | 150 | 600  | 42 | 0.76 | 1329 | 732 |
| 98  | 100 | 200 | 100 | 150 | 800  | 38 | 0.77 | 1411 | 683 |
| 99  | 100 | 200 | 100 | 150 | 1000 | 25 | 0.81 | 1473 | 521 |
| 100 | 100 | 200 | 100 | 150 | 1200 | 24 | 0.84 | 1653 | 513 |
| 101 | 100 | 200 | 100 | 200 | 600  | 37 | 0.76 | 1295 | 674 |
| 102 | 100 | 200 | 100 | 200 | 800  | 32 | 0.78 | 1455 | 587 |
| 103 | 100 | 200 | 100 | 200 | 1000 | 26 | 0.79 | 1468 | 539 |
| 104 | 100 | 200 | 100 | 200 | 1200 | 23 | 0.85 | 1742 | 509 |
| 105 | 100 | 200 | 100 | 300 | 600  | 34 | 0.78 | 1434 | 640 |
| 106 | 100 | 200 | 100 | 300 | 800  | 37 | 0.77 | 1423 | 643 |
| 107 | 100 | 200 | 100 | 300 | 1000 | 38 | 0.76 | 1308 | 672 |
| 108 | 100 | 200 | 100 | 300 | 1200 | 25 | 0.83 | 1559 | 529 |

TABLE 10

| No. | Proportion (parts by weight) Activated carbon | PVB | Meso-phase carbon | Aging ° C. | Heat-trating temperature ° C. | Capacitance F/g | Apparent density g/cm$^3$ | Three-point bending strength gf/cm$^2$ | Specific surface m$^2$/g |
|---|---|---|---|---|---|---|---|---|---|
| 109 | 100 | 30  | 0   | 140 | 600  | 69 | 0.49 | 273  | 1583 |
| 110 | 100 | 30  | 0   | 150 | 500  | 71 | 0.48 | 254  | 1621 |
| 111 | 100 | 30  | 0   | 200 | 500  | 72 | 0.49 | 311  | 1767 |
| 112 | 100 | 30  | 0   | 300 | 500  | 71 | 0.47 | 237  | 1593 |
| 113 | 100 | 30  | 0   | 310 | 600  | 70 | 0.47 | 230  | 1581 |
| 114 | 100 | 30  | 0   | 300 | 1300 | 68 | 0.50 | 256  | 698  |
| 115 | 100 | 30  | 50  | 140 | 600  | 53 | 0.52 | 294  | 1108 |
| 116 | 100 | 30  | 50  | 150 | 500  | 52 | 0.50 | 275  | 1088 |
| 117 | 100 | 30  | 50  | 300 | 1300 | 44 | 0.49 | 258  | 787  |
| 118 | 100 | 30  | 50  | 310 | 600  | 50 | 0.48 | 286  | 965  |
| 119 | 100 | 30  | 100 | 140 | 600  | 45 | 0.53 | 293  | 811  |
| 120 | 100 | 30  | 100 | 150 | 500  | 46 | 0.53 | 293  | 832  |
| 121 | 100 | 30  | 100 | 300 | 1300 | 21 | 0.65 | 1275 | 358  |
| 122 | 100 | 30  | 100 | 310 | 600  | 24 | 0.55 | 289  | 521  |
| 123 | 100 | 100 | 0   | 150 | 500  | 58 | 0.50 | 283  | 1577 |
| 124 | 100 | 100 | 0   | 140 | 600  | 70 | 0.49 | 276  | 1611 |
| 125 | 100 | 100 | 0   | 200 | 500  | 70 | 0.50 | 294  | 1581 |
| 126 | 100 | 100 | 0   | 300 | 500  | 68 | 0.51 | 281  | 1561 |
| 127 | 100 | 100 | 0   | 310 | 600  | 65 | 0.50 | 251  | 1475 |
| 128 | 100 | 100 | 50  | 150 | 500  | 51 | 0.56 | 293  | 989  |
| 129 | 100 | 100 | 50  | 140 | 500  | 50 | 0.52 | 285  | 964  |
| 130 | 100 | 100 | 100 | 150 | 1300 | 21 | 0.78 | 1402 | 410  |
| 131 | 100 | 100 | 100 | 300 | 1300 | 22 | 0.75 | 1250 | 433  |

TABLE 11

| No. | Proportion (parts by weight) Activated carbon | PVB | Meso-phase carbon | Aging ° C. | Heat-trating temperature ° C. | Capacitance F/g | Apparent density g/cm$^3$ | Three-point bending strength gf/cm$^2$ | Specific surface m$^2$/g |
|---|---|---|---|---|---|---|---|---|---|
| 132 | 100 | 200 | 50  | 300 | 1300 | 23 | 0.83 | 1584 | 487  |
| 133 | 100 | 200 | 50  | 310 | 1200 | 26 | 0.79 | 1397 | 485  |
| 134 | 100 | 200 | 100 | 150 | 1300 | 22 | 0.88 | 1845 | 391  |
| 135 | 100 | 200 | 100 | 300 | 1300 | 23 | 0.80 | 1519 | 456  |
| 136 | 100 | 200 | 100 | 310 | 1200 | 22 | 0.78 | 1320 | 448  |
| 137 | 100 | 20  | 100 | 200 | 800  | 69 | 0.46 | 285  | 1567 |

TABLE 11-continued

| No. | Proportion (parts by weight) | | | Aging °C. | Heat-trating temperature °C. | Capacitance F/g | Apparent density g/cm³ | Three-point bending strength gf/cm² | Specific surface m²/g |
|---|---|---|---|---|---|---|---|---|---|
| | Activated carbon | PVB | Mesophase carbon | | | | | | |
| 138 | 100 | 20 | 100 | 200 | 1000 | 58 | 0.51 | 291 | 1211 |
| 139 | 100 | 220 | 0 | 150 | Deformed by aging | | | | |
| 140 | 100 | 220 | 0 | 200 | Deformed by aging | | | | |
| 141 | 100 | 220 | 0 | 300 | Deformed by aging | | | | |

The foregoing describes that in the present invention mesphase carbon is added as required to a mixture of an activated carbon powder and/or an activated carbon fiber and PVB, the resulting mixture was aged in air, and the aged product is heat-treated in a non-oxidizing atmosphere to carburize the PVB and mesophase carbon to produce a solid activated carbon. Therefore, the solid activated carbon can be efficiently produced even if the proportion of an activated carbon component is large. Also, a solid activated carbon having a large specific surface area and high strength can be produced at a high yield. Further, when it is used as an adsorbent, the mechanical strength and capacity required for the adsorbent can be improved.

Particularly, when the solid activated carbon is used as an electrode to constitute an electric double layer capacitor, the capacitance can be increased.

Example 4

A phenol-type activated carbon powder (specific surface area measured according to BET method: 1,700 m²/g), a phenolformaldehyde resin (Belpal S890, manufactured by Kanebo, Ltd.) as a thermosetting resin, and polysiloxane epoxy ether as a silane coupling agent were formulated in such a manner that C and Si are contained in the resulting solid activated carbon after heat-treatment in the ratios shown in Tables 12 to 14. To 100 parts by weight of the mixture were added 30 parts by weight of a powdery butyral resin as a thermoplastic resin, 25 parts by weight of a plasticizer, and a solvent. Each of these resulting raw materials was mixed at a rotation of 100 rpm using a universal mixing stirrer. The mixed raw material was allowed to pass through a mesh-screen and was then dried to obtain a granule. The obtained granular raw material was molded using a calendar roll molding machine to prepare a sheet molded compact with thickness of 1 mm.

The resulting sheet molded compact was cut into a sheet with a size of 50×70 (mm) and the sheet was heated at 400° C. for 2 hours to carry out the curing of the phenol resin and the de-binder for the thermoplastic resin. After that, the sheet was heat-treated at 800° C. in a vacuum furnace to carburize the phenol resin thereby producing an activated carbon substrate which was a complex of activated carbon, carbon and Si.

The three-point bending strength of the resulting activated carbon substrate was measured. The capacitance and internal resistance of the substrate when it was used for the electrode 1 of the simplified double layer capacitor shown in FIG. 1 were also measured. The results are shown in Tables 12 to 14.

It was confirmed from these results, the substrates containing no Si (Nos. 1, 9, 17, 25, 33 samples) had low internal resistance and a capacitance as high as 40 F/g to 60 F/g, but a strength as low as 450 g/mm² or less.

On the contrary, the examples of the present invention containing Si in an amount ranging from 0.5 to 10% by weight (Nos. 4–7, Nos. 11–15, Nos. 18–23, Nos. 26–30, Nos. 34–38, Nos. 42–44, and No. 50 samples) had a strength as high as 475 to 1,050 g/mm², and a capacitance ranging from 20 to 47 F/g. It was confirmed that, according to the present invention, the strength can be improved while maintaining the capacitance of 18 F/g or more which was required for the electric double layer capacitor.

TABLE 12

| No. | Composition after carburized (wt %) | | | Internal resistance (Ω) | Capacitance (F/g) | Strength (g/mm²) |
|---|---|---|---|---|---|---|
| | Activated carbon | Carburized substance of phenol resin | Si | | | |
| *1 | 90.0 | 10.0 | 0 | 0.06 | 60 | 220 |
| 2 | 89.5 | 10.0 | 0.5 | 0.12 | 57 | 275 |
| 3 | 88.0 | 10.0 | 2.0 | 0.15 | 50 | 380 |
| 4 | 86.0 | 10.0 | 4.0 | 0.18 | 44 | 475 |
| 5 | 84.0 | 10.0 | 6.0 | 0.20 | 38 | 575 |
| 6 | 82.0 | 10.0 | 8.0 | 0.22 | 32 | 680 |
| 7 | 80.0 | 10.0 | 10.0 | 0.25 | 24 | 775 |
| *8 | 78.0 | 10.0 | 11.0 | 0.30 | 19 | 880 |
| *9 | 85.0 | 15.0 | 0 | 0.12 | 55 | 330 |
| 10 | 84.5 | 15.0 | 0.5 | 0.15 | 52 | 375 |
| 11 | 83.0 | 15.0 | 2.0 | 0.18 | 45 | 480 |
| 12 | 81.0 | 15.0 | 4.0 | 0.20 | 39 | 575 |
| 13 | 79.0 | 15.0 | 6.0 | 0.22 | 33 | 675 |
| 14 | 77.0 | 15.0 | 8.0 | 0.24 | 28 | 780 |

TABLE 12-continued

| No. | Composition after carburized (wt %) | | | Internal resistance (Ω) | Capacitance (F/g) | Strength (g/mm²) |
|---|---|---|---|---|---|---|
| | Activated carbon | Carburized substance of phenol resin | Si | | | |
| 15 | 75.0 | 15.0 | 10.0 | 0.30 | 23 | 885 |
| *16 | 74.0 | 15.0 | 11.0 | 0.33 | 18 | 975 |
| *17 | 80.0 | 20.0 | 0 | 0.15 | 50 | 440 |
| 18 | 79.5 | 20.0 | 0.5 | 0.18 | 47 | 485 |
| 19 | 78.0 | 20.0 | 2.0 | 0.20 | 40 | 590 |
| 20 | 76.0 | 20.0 | 4.0 | 0.22 | 36 | 685 |
| 21 | 74.0 | 20.0 | 6.0 | 0.24 | 30 | 775 |
| 22 | 72.0 | 20.0 | 8.0 | 0.27 | 25 | 885 |
| 23 | 70.0 | 20.0 | 10.0 | 0.30 | 20 | 995 |
| *24 | 69.0 | 20.0 | 11.0 | 0.34 | 16 | 1075 |

The sample number with the symbol (*) is out of the claim of the present invention.

TABLE 13

| No. | Composition after carburized (wt %) | | | Internal resistance (Ω) | Capacitance (F/g) | Strength (g/mm²) |
|---|---|---|---|---|---|---|
| | Activated carbon | Carburized substance of phenol resin | Si | | | |
| *25 | 75.0 | 25.0 | 0 | 0.18 | 45 | 530 |
| 26 | 74.5 | 25.0 | 0.5 | 0.20 | 42 | 675 |
| 27 | 73.0 | 25.0 | 2.0 | 0.22 | 36 | 780 |
| 28 | 71.0 | 25.0 | 4.0 | 0.24 | 30 | 775 |
| 29 | 69.0 | 25.0 | 6.0 | 0.27 | 24 | 885 |
| 30 | 67.0 | 25.0 | 8.0 | 0.30 | 20 | 975 |
| 31 | 65.0 | 25.0 | 10.0 | 0.33 | 15 | 1080 |
| *32 | 64.0 | 25.0 | 11.0 | 0.37 | 11 | 1165 |
| *33 | 70.0 | 30.0 | 0 | 0.20 | 40 | 580 |
| 34 | 69.5 | 30.0 | 0.5 | 0.22 | 37 | 655 |
| 35 | 68.0 | 30.0 | 2.0 | 0.24 | 32 | 745 |
| 36 | 66.0 | 30.0 | 4.0 | 0.28 | 27 | 865 |
| 37 | 64.0 | 30.0 | 6.0 | 0.31 | 24 | 955 |
| 38 | 62.0 | 30.0 | 8.0 | 0.35 | 20 | 1050 |
| 39 | 60.0 | 30.0 | 10.0 | 0.39 | 15 | 1150 |
| *40 | 59.0 | 30.0 | 11.0 | 0.44 | 11 | 1245 |
| *41 | 65.0 | 35.0 | 0 | 0.24 | 32 | 580 |
| 42 | 64.5 | 35.0 | 0.5 | 0.27 | 29 | 655 |
| 43 | 63.0 | 35.0 | 2.0 | 0.30 | 24 | 745 |
| 44 | 61.0 | 35.0 | 4.0 | 0.33 | 20 | 865 |
| 45 | 59.0 | 35.0 | 6.0 | 0.36 | 16 | 955 |
| 46 | 57.0 | 35.0 | 8.0 | 0.40 | 13 | 1045 |
| 47 | 55.0 | 35.0 | 10.0 | 0.43 | 11 | 1150 |
| *48 | 54.0 | 35.0 | 11.0 | 0.45 | 8 | 1245 |

The sample number with the symbol (*) is out of the claim of the present invention.

TABLE 14

| No. | Composition after carburized (wt %) | | | Internal resistance (Ω) | Capacitance (F/g) | Strength (g/mm²) |
|---|---|---|---|---|---|---|
| | Activated carbon | Carburized substance of phenol resin | Si | | | |
| *49 | 60.0 | 40.0 | 0 | 0.28 | 29 | 650 |
| 50 | 59.5 | 40.0 | 0.5 | 0.32 | 25 | 755 |
| 51 | 58.0 | 40.0 | 2.0 | 0.35 | 22 | 825 |
| 52 | 56.0 | 40.0 | 4.0 | 0.38 | 16 | 915 |
| 53 | 54.0 | 40.0 | 6.0 | 0.41 | 15 | 1055 |
| 54 | 52.0 | 40.0 | 8.0 | 0.44 | 12 | 1175 |
| 55 | 50.0 | 40.0 | 30.0 | 0.47 | 10 | 1265 |
| *56 | 49.0 | 40.0 | 11.0 | 0.50 | 6 | 1355 |

The sample number with the symbol (*) is out of the claim of the present invention.

Example 5

A phenol-type activated carbon powder (specific surface area measured according to BET method: 1,700 m$^2$/g), a phenolformaldehyde resin (Belpal S890, manufactured by Kanebo, Ltd.) as a thermosetting resin, and powdery borosilicate glass were formulated in such a manner that C and Si are contained in the resulting solid activated caron after heat-treatment in the ratios shown in Tables 15 to 17. To 100 parts by weight of the mixture were added 30 parts by weight of a powdery butyral resin as a thermoplastic resin, 25 parts by weight of a plasticizer, and further a solvent. Each of these resulting raw materials was mixed at a rotation of 100 rpm using a universal mixing stirrer. The mixed raw material was allowed to pass through a mesh-screen and was then dried to obtain a granule. The obtained granular raw material was molded using a calendar roll to prepare a sheet molded compact with thickness of 1 mm.

The resulting sheet molded compact was cut into a sheet with a size of 50×70 (mm) and the sheet was heated at 400° C. for 2 hours to carry out the curing of the phenol resin and the de-binder for the thermoplastic resin. After that, the sheet was heat-treated at 800° C. in a vacuum furnace to carburize the phenol resin thereby producing an activated carbon substrate which was a complex of activated carbon, carbon and Si.

The three-point bending strength of the resulting activated carbon substrate was measured. The capacitance and internal resistance of the substrate when it was used for the electrode 1 of the simplified double layer capacitor shown in FIG. 1 were also measured. The results are shown in Tables 15 to 17.

It was confirmed from these results, the substrates containing no Si (Nos. 57, 65, 73, 81, 89, 97, and 105 samples) had a low internal resistance and a capacitance as high as 40 F/g to 60 F/g, but a strength as low as 450 g/mm$^2$ or less.

On the contrary, the examples of the present invention containing Si in an amount ranging from 0.5 to 10% by weight had a strength as high as 475 to 1,050 g/mm$^2$, and a capacitance ranging from 20 to 47 F/g. It was confirmed that, according to the present invention, the strength can be improved while maintaining the capacitance of 18 F/g or more which was required for the electric double layer capacitor.

TABLE 15

| No. | Composition after carburized (wt %) | | | Internal resistance (Ω) | Capacitance (F/g) | Strength (g/mm$^2$) |
|---|---|---|---|---|---|---|
| | Activated carbon | Carburized substance of phenol resin | Si | | | |
| *57 | 90.0 | 10.0 | 0 | 0.08 | 55 | 180 |
| 58 | 89.5 | 10.0 | 0.5 | 0.14 | 52 | 245 |
| 59 | 88.0 | 10.0 | 2.0 | 0.17 | 48 | 350 |
| 60 | 86.0 | 10.0 | 4.0 | 0.19 | 40 | 455 |
| 61 | 84.0 | 10.0 | 6.0 | 0.22 | 36 | 550 |
| 62 | 82.0 | 10.0 | 8.0 | 0.24 | 30 | 650 |
| 63 | 80.0 | 10.0 | 10.0 | 0.26 | 22 | 745 |
| *64 | 78.0 | 10.0 | 11.0 | 0.32 | 17 | 860 |
| *65 | 85.0 | 15.0 | 0 | 0.14 | 52 | 200 |
| 66 | 84.5 | 15.0 | 0.5 | 0.17 | 50 | 345 |
| 67 | 83.0 | 15.0 | 2.0 | 0.28 | 42 | 450 |
| 68 | 81.0 | 15.0 | 4.0 | 0.22 | 37 | 545 |
| 69 | 79.0 | 15.0 | 6.0 | 0.24 | 31 | 645 |
| 70 | 77.0 | 15.0 | 9.0 | 0.27 | 26 | 760 |
| 71 | 75.0 | 15.0 | 10.0 | 0.32 | 21 | 860 |
| *72 | 74.0 | 15.0 | 11.0 | 0.35 | 16 | 950 |
| *73 | 80.0 | 20.0 | 0 | 0.17 | 48 | 410 |
| 74 | 79.5 | 20.0 | 0.5 | 0.20 | 45 | 455 |
| 75 | 78.0 | 20.0 | 2.0 | 0.22 | 38 | 565 |
| 76 | 76.0 | 20.0 | 4.0 | 0.24 | 34 | 660 |
| 77 | 74.0 | 20.0 | 6.0 | 0.26 | 28 | 745 |
| 78 | 72.0 | 20.0 | 8.0 | 0.29 | 23 | 855 |
| 79 | 70.0 | 20.0 | 10.0 | 0.32 | 18 | 965 |
| *80 | 69.0 | 20.0 | 11.0 | 0.36 | 14 | 1045 |

The sample number with the symbol (*) is out of the claim of the present invention.

TABLE 16

| No. | Composition after carburized (wt %) | | | Internal resistance (Ω) | Capacitance (F/g) | Strength (g/mm$^2$) |
|---|---|---|---|---|---|---|
| | Activated carbon | Carburized substance of phenol resin | Si | | | |
| *81 | 75.0 | 25.0 | 0 | 0.20 | 42 | 500 |
| 82 | 74.5 | 25.0 | 0.5 | 0.22 | 40 | 645 |
| 83 | 73.0 | 25.0 | 2.0 | 0.24 | 34 | 755 |
| 84 | 71.0 | 25.0 | 4.0 | 0.26 | 28 | 745 |

TABLE 16-continued

| No. | Composition after carburized (wt %) | | | Internal resistance ($\Omega$) | Capacitance (F/g) | Strength (g/mm$^2$) |
|---|---|---|---|---|---|---|
| | Activated carbon | Carburized substance of phenol resin | Si | | | |
| 85 | 69.0 | 25.0 | 6.0 | 0.29 | 22 | 860 |
| 86 | 67.0 | 25.0 | 8.0 | 0.32 | 18 | 950 |
| 87 | 65.0 | 25.0 | 10.0 | 0.34 | 12 | 1050 |
| *88 | 64.0 | 25.0 | 11.0 | 0.38 | 10 | 1140 |
| *89 | 70.0 | 30.0 | 0 | 0.22 | 38 | 550 |
| 90 | 69.5 | 30.0 | 0.5 | 0.24 | 35 | 630 |
| 91 | 68.0 | 30.0 | 2.0 | 0.26 | 30 | 715 |
| 92 | 66.0 | 30.0 | 4.0 | 0.28 | 25 | 840 |
| 93 | 64.0 | 30.0 | 6.0 | 0.33 | 22 | 925 |
| 94 | 62.0 | 30.0 | 8.0 | 0.37 | 18 | 1020 |
| 95 | 60.0 | 30.0 | 10.0 | 0.32 | 12 | 1125 |
| *96 | 59.0 | 30.0 | 11.0 | 0.45 | 10 | 1215 |
| *97 | 65.0 | 35.0 | 0 | 0.26 | 30 | 550 |
| 98 | 64.5 | 35.0 | 0.5 | 0.29 | 27 | 625 |
| 99 | 63.0 | 35.0 | 2.0 | 0.32 | 22 | 715 |
| 100 | 61.0 | 35.0 | 4.0 | 0.35 | 18 | 840 |
| 101 | 59.0 | 35.0 | 6.0 | 0.38 | 14 | 925 |
| 102 | 57.0 | 35.0 | 8.0 | 0.42 | 31 | 1015 |
| 103 | 55.0 | 35.0 | 10.0 | 0.44 | 9 | 1120 |
| *104 | 54.0 | 35.0 | 11.0 | 0.47 | 6 | 1215 |

The sample number with the symbol (*) is out of the claim of the present invention.

TABLE 17

| No. | Composition after carburized (wt %) | | | Internal resistance ($\Omega$) | Capacitance (F/g) | Strength (g/mm$^2$) |
|---|---|---|---|---|---|---|
| | Activated carbon | Carburized substance of phenol resin | Si | | | |
| *105 | 60.0 | 40.0 | 0 | 0.26 | 27 | 620 |
| 106 | 59.5 | 40.0 | 0.5 | 0.34 | 22 | 725 |
| 107 | 58.0 | 40.0 | 2.0 | 0.37 | 20 | 800 |
| 108 | 56.0 | 40.0 | 4.0 | 0.40 | 16 | 885 |
| 109 | 54.0 | 40.0 | 6.0 | 0.43 | 13 | 1025 |
| 110 | 52.0 | 40.0 | 8.0 | 0.46 | 10 | 1145 |
| 111 | 50.0 | 40.0 | 10.0 | 0.48 | 8 | 1215 |
| *112 | 49.0 | 40.0 | 11.0 | 0.52 | 5 | 1325 |

The sample number with the symbol (*) is out of the claim of the present invention.

As above-mentioned, according to the solid activated carbon of the present invention which contains Si in an amount ranging from 0.5 to 10% by weight whereby the strength can be increased while maintaining the characteristics of the activated carbon which are represented by a large specific surface area and capacitance.

Because of the above features, a high performance electric double layer capacitor having a high capacitance can be produced if the solid activated carbon is used to form the electrode of the electric double layer capacitor. Because of high strength, the production and fabrication are easy so that the mass-production of the high performance electric double layer capacitor is made possible.

In the present invention, also a raw material consisting of an activated carbon powder and/or an activated carbon fiber, silane coupling agent and/or glass, and binder component such as a thermosetting resin is molded and the molded compact is heat-treated in a non-oxidizing atmosphere, thereby manufacturing a solid activated carbon with high strength with ease.

Example 6

The solid activated carbon of the present invention was evaluated as follows:

First, to 100 parts by weight of coconut husk-type activated carbon powders having BET value of 1,000 m$^2$/g, 1,500 m$^2$/g, or 2,000 m$^2$/g were added PVB and mesophase so that the proportions of PVB and mesophase were 100 parts by weight and 20 parts by weight respectively. Each prepared mixture was stirred using a high speed mixing stirrer to prepare a powder, which was successively screened using a 40 mesh screen to produce a molding raw material.

Next, the molding raw material was molded by press molding or roll molding to prepare a plate molded compact. The molded compact was retained in air at 200° C. for 48 hours to carry out aging and was then carburiz heat-treated in vacuum at the temperature and retention time shown in Table 18 to carburize PVB and mesophase to produce an activated carbon substrate for evaluation which is a complex of activated carbon and carbon, the substrate having a size of 70 mm length, 50 mm width and 1 mm thickness.

The pore distribution of the resulting activated carbon substrate for evaluation was measured from the argon absorption isotherm (HK method) using an instrument (Asap 2010-type, manufactured by Shimazu-Micromerthick) and the ratio of the volume of pores with a size of 15 angstroms or less was calculated.

Figure 2:
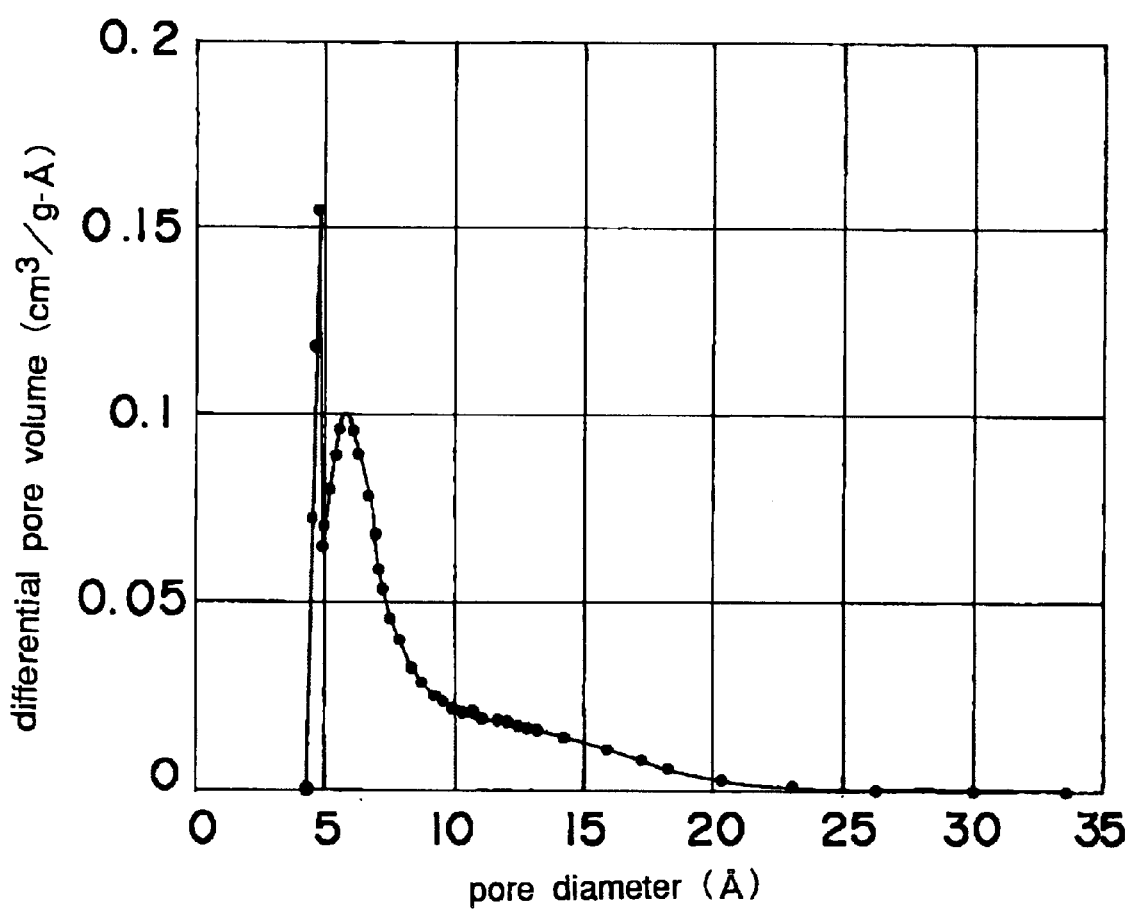
FIG. 2 is a pore distribution map calculated from the argon absorption isotherm of the solid activated carbon corresponding to an example of the present invention.

FIG. 2 shows the pore distribution calculated from the argon absorption isotherm of the sample No. 2 which is a typical solid activated carbon of the present invention.

The activated carbon substrate for evaluation was used as an electrode of an electric double layer capacitor. The capacitor was charged for 30 minutes at a voltage of 0.9 V in 40 wt% aqueous sulfuric acid solution and then the capacitance (F/cm$^3$) per unit volume of the electrode was measured by a constant-current discharge method at an electric current of 30 mA/cm$^2$.

In addition, the three-point bending strength of the activated carbon substrate for evaluation was measured according to JIS-R-1601 standard.

TABLE 18

| Sample number | BET value of activated carbon (m$^2$/g) | Carburizing treatment Temperature (° C.) | Time (min.) | Pore volume ≦15 angstroms (%) | Capacitance (F/cc) (Å) | Bending strength (g/mm$^2$) | Remark |
|---|---|---|---|---|---|---|---|
| *1 | 2000 | 700 | 240 | 88.0 | — | 108 | Measurement was impossible. |
| 2 | 2000 | 800 | 10 | 85.3 | 40.0 | 382 | |
| 3 | 2000 | 800 | 30 | 80.1 | 34.1 | 391 | |
| 4 | 2000 | 800 | 60 | 75.8 | 29.6 | 401 | |
| 5 | 2000 | 800 | 120 | 73.6 | 27.5 | 412 | |
| 6 | 2000 | 800 | 240 | 73.1 | 27.0 | 422 | |
| 7 | 2000 | 900 | 10 | 81.5 | 35.6 | 509 | |
| 8 | 2000 | 900 | 30 | 76.3 | 30.1 | 521 | |
| 9 | 2000 | 900 | 60 | 71.8 | 25.8 | 535 | |
| 10 | 2000 | 900 | 120 | 69.5 | 23.7 | 549 | |
| 11 | 2000 | 900 | 240 | 67.9 | 22.4 | 563 | |
| 12 | 2000 | 1000 | 10 | 77.8 | 31.6 | 678 | |
| 13 | 2000 | 1000 | 30 | 72.6 | 26.5 | 695 | |
| 14 | 2000 | 1000 | 60 | 67.7 | 22.2 | 713 | |
| 15 | 2000 | 1000 | 120 | 65.5 | 20.4 | 732 | |
| *16 | 2000 | 1000 | 240 | 63.7 | 19.0 | 751 | |
| 17 | 2000 | 1100 | 10 | 73.8 | 27.6 | 905 | |
| 18 | 2000 | 1100 | 30 | 68.9 | 23.2 | 926 | |
| *19 | 2000 | 1100 | 120 | 62.5 | 18.1 | 977 | |
| *20 | 2000 | 1100 | 240 | 60.7 | 16.8 | 1001 | |
| 21 | 2000 | 1200 | 10 | 69.9 | 24.1 | 1206 | |
| 22 | 2000 | 1200 | 30 | 65.3 | 20.2 | 1236 | |
| *23 | 2000 | 1200 | 60 | 60.6 | 16.7 | 1268 | |
| *24 | 2000 | 1300 | 10 | 64.5 | 19.6 | 889 | |
| 25 | 1500 | 800 | 10 | 72.5 | 26.4 | 458 | |
| 26 | 1500 | 800 | 30 | 68.1 | 22.5 | 469 | |
| 27 | 1500 | 900 | 10 | 69.3 | 23.5 | 611 | |
| *28 | 1500 | 900 | 30 | 53.9 | 19.9 | 506 | |
| 29 | 1500 | 1000 | 10 | 66.1 | 20.9 | 814 | |
| *30 | 1500 | 1000 | 30 | 61.7 | 17.5 | 834 | |
| *31 | 1500 | 1100 | 10 | 62.7 | 18.3 | 1085 | |
| 32 | 1000 | 800 | 10 | 65.5 | 20.4 | 649 | |

Sample numbers with the symbol (*) is out of the claim of the present invention.

As is clear from Table 18, in the sample of No. 1 which is out of the claim of the present invention, though the volume of the pores with a size of 15 angstroms or less is 65% or more for the total volume of pores, the capacitance could not be measured at the time of discharging at a current as low as 30 mA/cm$^2$. The sample of No. 1 had also a bending strength as low as 108 g/mm$^2$. In the samples of Nos. 16, 19, 20, 23, 24, 28, 30 and 31, the volume of the pores with a size of 15 angstroms or less is less than 65% for the total volume of pores and the capacitance at the time of discharging at a current as low as 30 mA/cm$^2$ was as low as 20 F/cm$^3$. As a consequence, these samples were unsuitable for multipurpose solid activated carbon materials including a polarizable electrode for an electric double layer capacitor. In contrast to these samples, all of the samples according to the present invention had a large capacitance at the time of discharging at a low current and a bending strength of 382 g/mm$^2$ or more.

As described in detail, in the present invention, a general purpose solid activated carbon can be manufactured which has a large capacitance measured by a constant-current discharge method at a current as low as 30 mA/cm$^2$ and possesses large mechanical strength and high durability. The solid activated carbon of the present invention is suitable particularly for electrode materials used for an electric double layer capacitor and various batteries for auxiliary power sources. When the solid activated carbon of the present invention is used for a polarizable electrode, the surface area which, as the electrode, is in contact with an electrolyte increases and electric paths through which electric charges pass also increase. Therefore, a small-sized electric double layer capacitor can be manufactured which has practical capacitance with a simple structure and high efficiency, exhibiting excellent durability.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A process for manufacturing a solid activated carbon comprising the steps of:

molding a mixture including an activated carbon powder and/or an activated carbon fiber and a polymer of a vinyl alcohol or its derivatives, wherein said mixture contains mesophase carbon in an amount of 5 to 100 parts by weight for 100 parts by weight of said activated carbon powder and activated carbon fiber;

aging the molded compact in air; and heat-treating the aged compact in a non-oxidizing atmosphere.

2. The process according to claim 1, wherein said polymer is polyvinylbutyral.

3. The process according to claim 1, wherein said molded compact is a sheet formed from a slurry of said mixture.

4. The process according to claim 1, wherein said molded compact is a block or sheet formed from a granule of said mixture.

5. An electric double layer capacitor using, as a polarizable electrode, the solid activated carbon according the process of claim 1.

6. An electric double layer capacitor using, as a polarizable electrode, a solid activated carbon having, an activated carbon powder and/or an activated carbon fiber; and a carburized substance produced by heat-treating a polymer selected from the group consisting of polyvinyl alcohol, polyvinylacetal, polyvinylformal, polyvinylacetate, polyvinylacetoacetal and polyvinylbutyral, wherein the solid activated carbon has a three-point bending strength of at least 300 g/mm$^2$.

* * * * *